United States Patent
Nakano (10) Patent No.: US 7,076,580 B2
(45) Date of Patent: Jul. 11, 2006

(54) INTERFACE CONVERTER HAVING SWITCHING ABILITY

(75) Inventor: Manabu Nakano, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 226 days.

(21) Appl. No.: 10/669,326

(22) Filed: Sep. 25, 2003

(65) Prior Publication Data

US 2004/0064598 A1 Apr. 1, 2004

(30) Foreign Application Priority Data

Sep. 30, 2002 (JP) ............................. 2002-286475

(51) Int. Cl.
*G06F 13/00* (2006.01)
(52) U.S. Cl. ......................... 710/65; 710/11; 710/14; 710/315; 370/466
(58) Field of Classification Search ........ 370/464–467; 710/8–14, 15–19, 36–38, 62–64, 71–74, 710/305–316
See application file for complete search history.

(56) References Cited

U.S. PATENT DOCUMENTS

| | | | |
|---|---|---|---|
| 5,715,274 A | | 2/1998 | Rostoker |
| 6,006,295 A * | | 12/1999 | Jones et al. .................... 710/62 |
| 6,199,122 B1 * | | 3/2001 | Kobayashi .................... 710/36 |
| 6,233,640 B1 * | | 5/2001 | Luke et al. .................. 710/315 |
| 6,292,863 B1 * | | 9/2001 | Terasaki et al. ............. 710/313 |
| 6,505,267 B1 * | | 1/2003 | Luke et al. .................. 710/315 |
| 6,618,788 B1 * | | 9/2003 | Jacobs ......................... 710/315 |
| 6,633,933 B1 * | | 10/2003 | Smith et al. ................... 710/74 |
| 2002/0081873 A1 * | | 6/2002 | Harris et al. ................... 439/79 |
| 2004/0205280 A1 * | | 10/2004 | Jeansonne et al. .......... 710/306 |
| 2005/0060479 A1 * | | 3/2005 | Deng et al. .................. 710/306 |
| 2005/0144495 A1 * | | 6/2005 | Nakajima et al. ........... 713/340 |

* cited by examiner

Primary Examiner—Christopher Shin
(74) Attorney, Agent, or Firm—Arent Fox PLLC (57) ABSTRACT

An interface converter for functionally connecting external devices having interfaces complying with different standards. The interface converter includes a USB-ATAPI command converter and a USB-ATA command converter. A switching controller checks the type of the interface of each external device and activates one of the command converters in accordance with the result of the checking.

17 Claims, 12 Drawing Sheets

INTERFACE CONVERTER HAVING SWITCHING ABILITY

CROSS-REFERENCES TO RELATED APPLICATIONS

This application is based upon and claims the benefit of priority from prior Japanese Patent Application No. 2002-286475 filed on Sep. 30, 2002, the entire contents of which are incorporated herein by reference.

BACKGROUND OF THE INVENTION

The present invention relates to an interface converter for functionally connecting two devices that comply with different interface standards.

Interface standards progress at high speeds. To adapt to a new interface standard, a conventional device must have an interface that complies with the new interface standard. For example, when using a peripheral device that complies with a new interface standard, an interface that complies with the new interface standard must be provided for a main device. However, it takes much time to develop a main device that has an interface complying with the new standard. Thus, there is a demand for an interface converter that adapts a main device, which does not have an interface complying with a new standard, to a new interface standard.

A conventional main device, such as a personal computer, is provided with an interface complying with the AT Attachment Packet Interface (ATAPI) standard or the AT Attachment (ATA) standard to perform data communication with peripheral devices (refer to U.S. Pat. No. 5,715,274). In recent years, interfaces complying with the Universal Serial Bus 2.0 standard (hereafter simply referred to as USB) are often used in main devices and peripheral devices to facilitate connection and disconnection of the peripheral devices. For example, the USB interface enables two devices to be connected and disconnected in a state in which the power supply is activated. Devices having USB devices have therefore become popular.

Much time is required to newly develop a main device or a peripheral device provided with a USB interface. Thus, an interface converter is used to convert commands, status, and data between a USB interface and an interface complying with other standards. For example, a USB-ATAPI converter converts commands, status, and data complying with the USB standard to those complying with the ATAPI standard. A USB-ATA converter converts commands, status, and data complying with the USB standard to those complying with the ATA standard. The employment of the interface converter enables a main device or a peripheral device complying with the USB standard to be developed within a short period of time.

The commands and layout of signal lines differ between an interface complying with the ATAPI standard and an interface complying with the ATA standard. However, the connectors of the ATAPI and ATA connectors have identical shapes. Therefore, for example, the USB-ATIPI converter may be connected to a connector of an ATA device. However, communication cannot be performed between the ATA device and the USB device. Accordingly, there is a shortcoming in that communication cannot be performed with the USB device even though the interface converter is connected.

SUMMARY OF THE INVENTION

One aspect of the present invention is an interface converter connected to a device having an interface. The interface converter including a first command converter for converting a command between one complying with a first interface standard and one complying with a second interface standard. A second command converter converts a command between one complying with the first interface standard and one complying with a third interface standard. A switching controller checks whether the interface of the device complies with the second interface or the third interface and selects the first command converter or the second command converter in accordance with the checking result.

Another aspect of the present invention is a method for converting a command between one complying with a first interface standard and one complying with a second or third interface standard for communication with a device through an interface thereof. The method includes connecting the interface of the device to an interface converter having first and second command converters, which convert commands from compliance with the first interface standard to compliance with the second or third interface standard, respectively. The method further includes checking whether the interface of the device connected to the interface converter complies with the second interface standard or the third interface standard, and selecting the first command converter or the second command converter in accordance with the result of said checking.

A further aspect of the present invention is an interface converter for functionally connecting a first device having an interface complying with a first interface standard and a second device having an interface complying with a second interface standard or a third interface standard. The interface converter includes a first command converter for converting a command between one complying with the first interface standard and one complying with the second interface standard. A second command converter converting a command between one complying with the first interface standard and one complying with the third interface standard. A switching controller checks whether the interface of the second device complies with the second interface or the third interface and activates the first command converter or the second command converter in accordance with the checking result.

A further aspect of the present invention is a method for functionally connecting a first device having an interface complying with a first interface standard and a second device having an interface complying with a second interface standard or a third interface standard. The method includes providing first and second command converters, which convert a command between one complying with the first interface standard and one complying with the second or third interface standard, respectively. The method further includes checking whether the interface of the second device complies with the second interface standard or the third interface standard, and activating the first command converter or the second command converter in accordance with the result of said checking.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An interface converter 1 according to a preferred embodiment of the present invention will now be discussed with reference to FIGS. 1 to 10.

Figure 1:
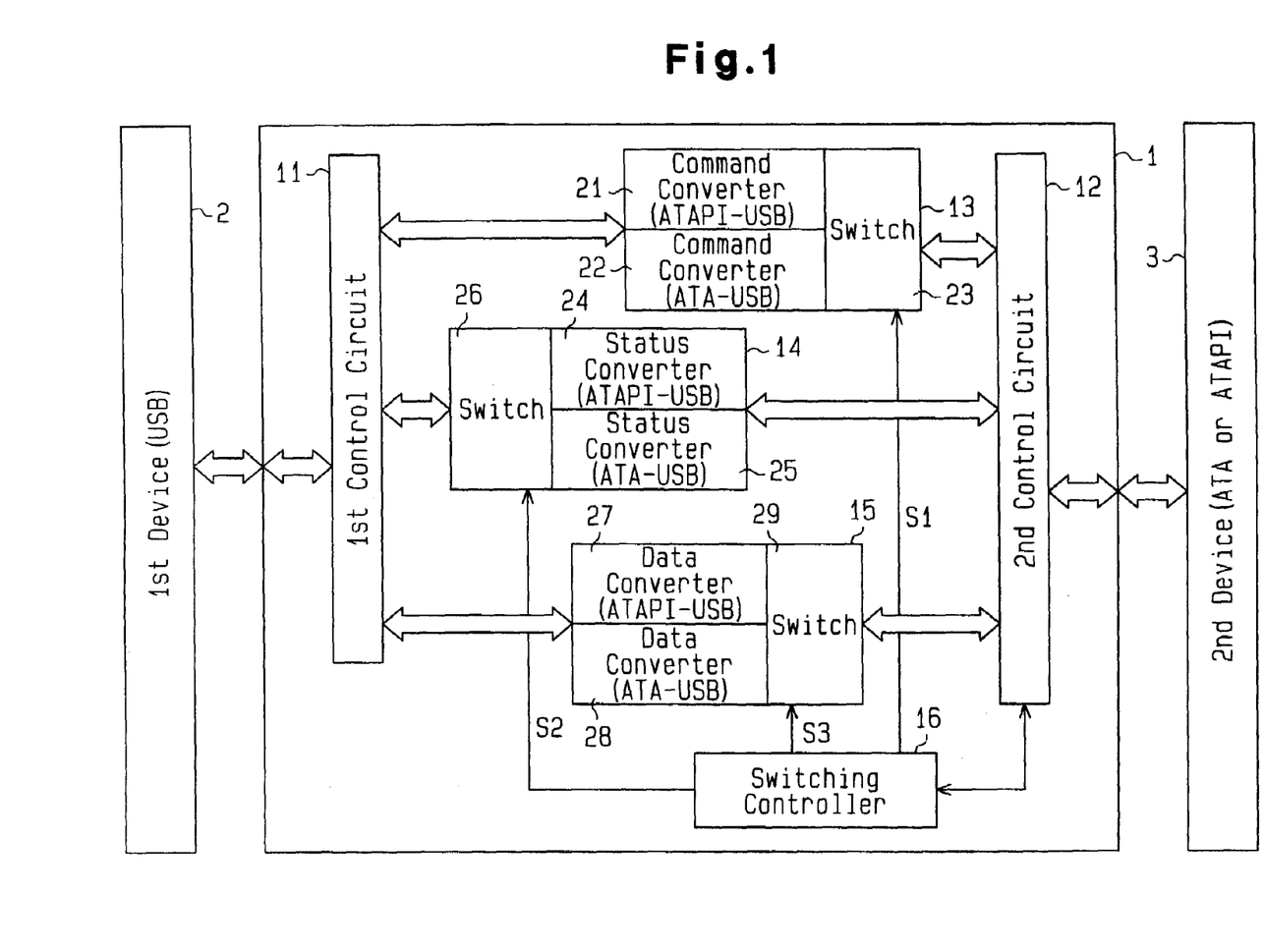
FIG. 1 is a block diagram of an interface converter according to a preferred embodiment of the present invention.

With reference to FIG. 1, the interface converter 1 functionally connects a first device (host device) 2 to a second device 3 (peripheral device). The first device 2 has an interface complying with a first interface standard, or the Universal Serial Bus 2.0 (USB). The second device 3 has an interface complying with either one of a second interface standard, or the ATAPI, and a third interface standard, or the ATA. The interface converter 1 converts commands, status, and data between the USB and ATAPI interfaces and between the USB and ATA interfaces.

The interface converter 1 includes a first control circuit 11, a second control circuit 12, a command converting section 13, a status converting section 14, a data converting section 15, and an interface checking/switching controller (hereafter referred to as switching controller) 16.

The first control circuit 11, which complies with the first interface standard, converts electric signals processed in the interface converter 1 to electric signals complying with the USB standard and outputs the converted electric signals. Further, the first control circuit 11 converts electric signals, which are provided from the first device 2 and comply with the USB standard, to electric signals that are processed in the interface converter 1.

The second control circuit 12, which complies with the second interface standard and the third interface standard, converts electric signals processed in the interface converter 1 to electric signals complying with the ATAPI standard or the ATA standard. Further, the second control circuit 12 converts electric signals, which are provided from the second device 3 and comply with the ATAPI or ATA standard, to electric signals that are processed in the interface converter 1.

The command converting section 13 includes a first command converter 21, which serves as a first command converting means, a second command converter 22, which serves as a second command converting means, and a switch circuit 23. The first command converter 21 converts a USB command to an ATAPI command and an ATAPI command to a USB command. The second command converter 22 converts a USB command to an ATA command and an ATA command to a USB command. The switch circuit 23 connects the first command converter 21 or the second command converter 22 to the first and second control circuits 11 and 12 in response to a first switch signal S1.

The status converting section 14 includes a first status converter 24, which serves as a first status converting means, a second status converter 25, which serves as a second status converting means, and a switch circuit 26. The first status converter 24 converts a USB status to an ATAPI status and an ATAPI status to a USB status. The second status converter 25 converts a USB status to an ATA status and an ATA status to a USB status. The switch circuit 26 connects the first status converter 24 or the second status converter 25 to the first and second control circuits 11 and 12 in response to a second switch signal S2.

The data converting section 15 includes a first data converter 27, which serves as a first data converting means, a second data converter 28, which serves as a second data converting means, and a switch circuit 29. The first data converter 27 converts USB data to ATAPI data and ATAPI data to USB data. The second data converter 28 converts USB data to ATA data and ATA data to USB data. The switch circuit 29 connects the first data converter 27 or the second data converter 28 to the first and second control circuits 11 and 12 in response to a third switch signal S3.

The switching controller 16 checks the interface type (ATA or ATAPI or others) of the second device 3 connected to the interface converter 1 and generates the switch signals S1 to S3 to select the converters (21 or 22, 24 or 25, and 27 or 28) that are in accordance with the interface type. More specifically, the switching controller 16 sends a command to the second device 3 via the second control circuit 12 and checks the interface type of the second device 3 based on a response from the second device 3. Further, the switching controller 16 generates the switch signals S1 to S3 to activate the converters corresponding to the interface of the second device 3 and provides the switch signals S1, S2, and S3 respectively to the command converting section 13, the status converting section 14, and the data converting section 15.

In this manner, the interface converter 1 of the preferred embodiment includes the first and second command converters 21 and 22, the first and second status converters 24 and 25, and the first and second data converters 27 and 28 that respectively comply with the ATA and ATAPI standards. Further, the switching controller 16 checks the interface type, or attribute, of the second device 3 to activate one of the command converters 21 and 22, one of the status converters 24 and 25, and one of the data converters 27 and 28 in accordance with the interface type. The selected converters corresponding to the interface type of the second device 3 functionally connect the first and second devices 2 and 3.

Figure 2:
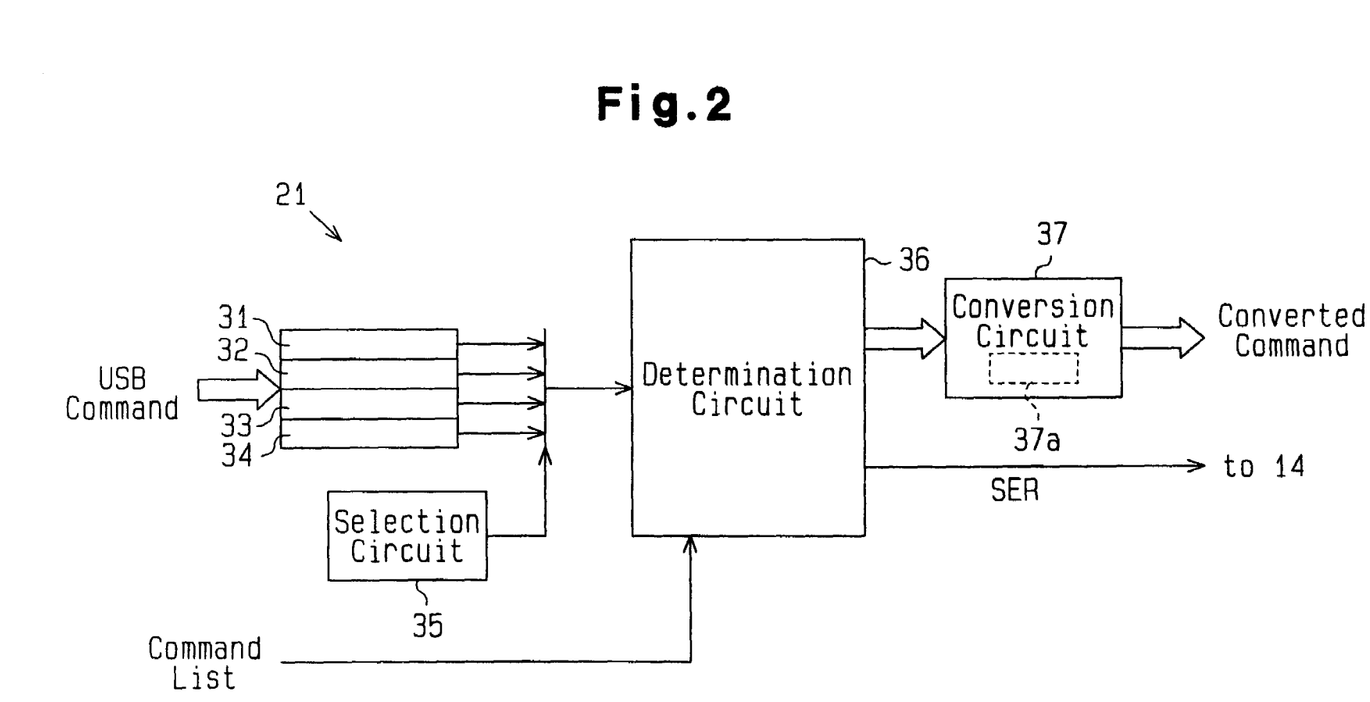
FIG. 2 is a block diagram of a command converter.

The first and second command converters 21 and 22 will now be described. FIG. 2 is a block diagram showing the first command converter 21. The first command converter 21 includes a plurality of (four in FIG. 2) of memories 31, 32, 33, and 34, a selection circuit 35, a determination circuit 36, which serves as a determining means, and a conversion circuit 37. The memories 31 to 34 are sequentially provided with commands from the first device 2, and each of the memories 31 to 34 store a single command.

In accordance with the commands stored in the memories 31 to 34, the selection circuit 35 selects one of the memories 31 to 34 and provides the determination circuit 36 with the command stored in the selected memory. For example, the selection circuit 35 selects the order of the commands stored in the memories 31 to 34 so that the total execution time of the commands by the second device 3 is reduced.

The determination circuit 36 determines whether or not to convert each of the provided commands. When a command must be converted, the determination circuit 36 provides the command to the conversion circuit 37. When a command does not have to be converted, the determination circuit 36 sends an error response output signal SER to the status converting section 14.

More specifically, commands that generate an error response are recorded on a command list (not shown). The determination circuit 36 refers to the command list and checks whether the commands received from the memories 31 to 34 match any of the commands in the command list. The determination circuit 36 provides the conversion circuit 37 with the received command when the received command does not match any of the commands in the command list. When the received command matches a command in the command list, the determination circuit 36 provides the error response output signal SER to the status converting section 14.

In the status converting section 14, the first status converter 24 provides the first device 2 with an error status signal in response to the error response output signal SER. That is, when the first device 2 provides the interface converter 1 with a command that is not supported by the second device 3, the interface converter 1 checks the command and provides the first device 2 with the error status signal, which is in accordance with the checked command. In this case, the command is not converted in the interface converter 1 and the command does not reach the second device 3. This reduces the response time and improves response.

The conversion circuit 37 performs only format conversion. A USB command is data consisting of a plurality of bytes and includes an ATA command (same operation being represented by the same code). Accordingly, the conversion circuit 37 of the first command converter 21 retrieves the ATA command from the USB command and outputs the retrieved command.

The second command converter 22 is configured in the same manner as the first command converter 21 except in that the conversion circuit 37 functions differently. Operations that are substantially the same are represented by different codes in the USB command and the ATAPI command. The conversion circuit 37 of the second command converter 22 includes a table 37a associating USB commands with ATAPI commands. The conversion circuit 37 refers to the table 37a to convert a USB command to an ATAPI command and outputs the converted command.

The first data converter 27 and the second data converter 28 will now be discussed.

Figure 3:
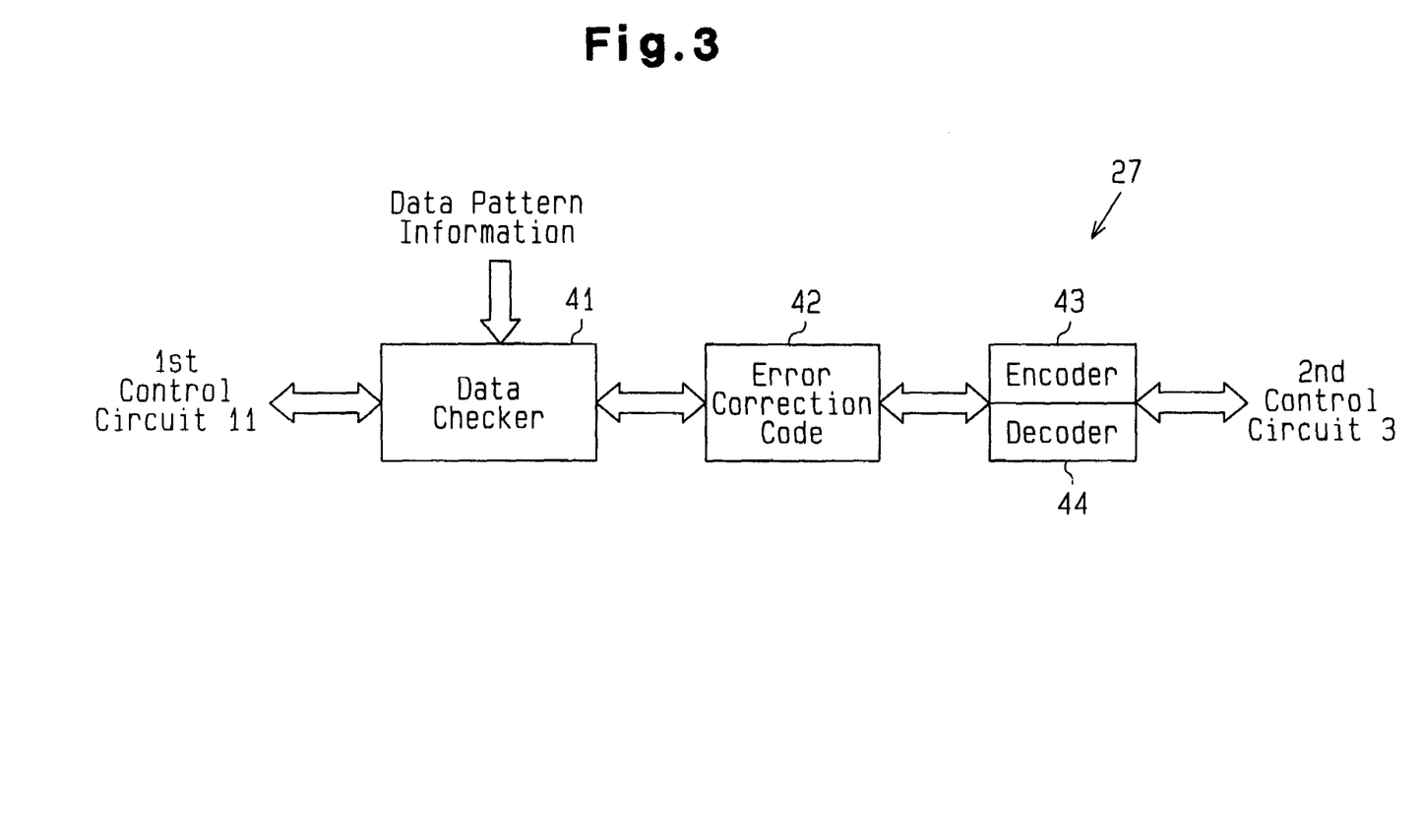
FIG. 3 is a block diagram of a data converter.

FIG. 3 is a block diagram of the first data converter 27. The second data converter 28 is configured in the same manner as the first data converter 27 and will thus not be described.

The first data converter 27 includes a data checker 41, an error correction code processor 42, an encoder 43, and a decoder 44.

The data checker 41 is provided with USB data and data pattern information. The data pattern information includes data patterns of computer viruses and is registered in a storage circuit, such as a memory. The data checker 41 refers to the data pattern information to perform a virus check on the received data (input data) and outputs the input data when confirming that viruses are not included in the data. More specifically, the data checker 41 checks whether the input data has a data pattern matching a data pattern included in the data pattern information. The data checker 41 outputs the input data only when it does not have a data pattern included in the data pattern information. Thus, the data checker 41 prevents viruses from entering the devices 2 and 3.

The error correction code processor 42 adds at least one of an error correction code (ECC) and an error detection code, such as a cyclic redundancy check (CRC), to the received data (input data) and then outputs the data. Further, the error correction code processor 42 uses the error correction code or the error detection code included in the input data to detect and correct errors in the input data. Then, the error correction code processor 42 outputs the processed data. Accordingly, the error correction code processor 42 increases the reliability of the data transfer between the first device 2 and the second device 3.

The encoder 43 encodes the data received from the error correction code processor 42 in accordance with a predetermined algorithm and provides the second device 3 with the encoded data.

The decoder 44 decodes the data received from the second device 3 in accordance with an algorithm that is reversed from that of the encoder 43 and outputs the decoded data. For example, when the second device 3 is a hard disk drive (HDD), data from the USB interface of the first device 2 is encoded and written to the HDD. The decoder 44 decodes the data read from the HDD and provides the first device 2 with the decoded data.

In this case, when a third person obtains only the second device 3 (HDD), the third person would not be able to decode the encoded data recorded in the HDD. Thus, the third person would not be able to confirm the contents of the data recorded to the HDD. Accordingly, the interface converter 1 prevents the leakage of information.

Figure 4:
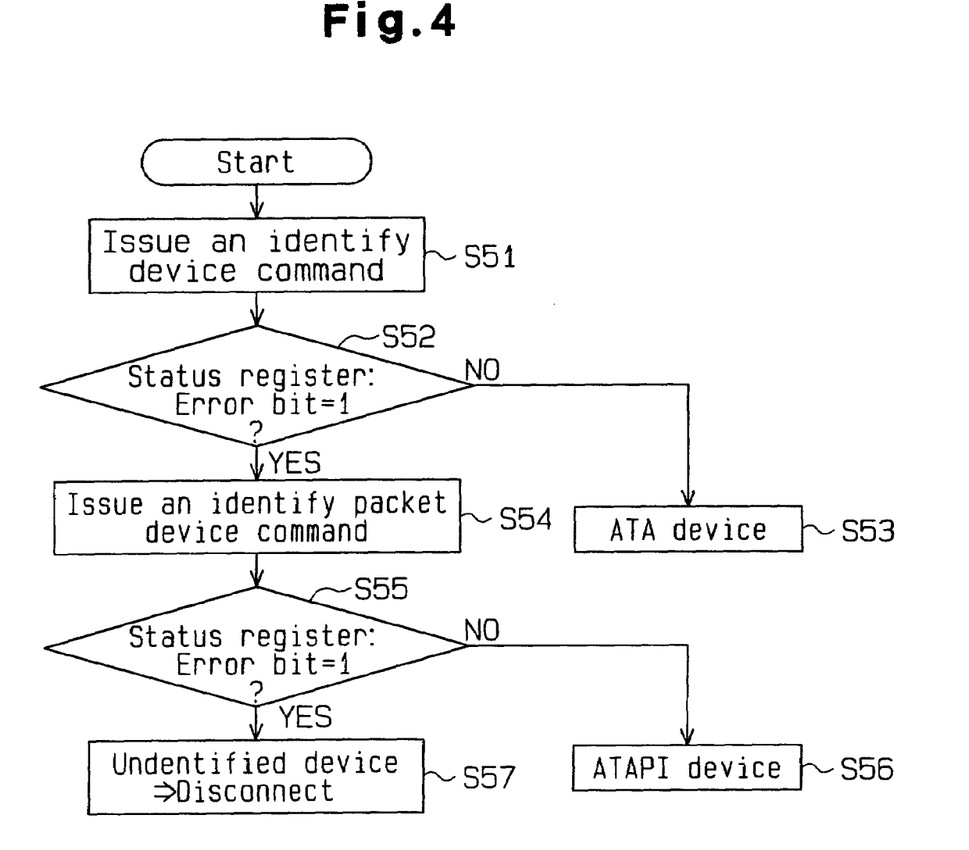
FIG. 4 is a flowchart illustrating an interface checking process.

The checking of the interface type by the switching controller 16 will now be discussed with reference to FIG. 4.

In step S51, the switching controller 16 issues an identify device command for the second device 3. The device identify command complies with the ATA standard. In step S52, the switching controller 16 reads status information of the second device 3, or data of a status register, and checks an error bit of the read data. When the error bit is "1", this indicates that the second device 3 does not accept the identify device command. Thus, the switching controller 16 determines that the second device 3 does not support the identify device command (ATA standard) and proceeds to step S54. If the error bit is not "1" (NO in step S52), this indicates that the second device 3 supports the identify device command (ATA standard). Thus, the switching controller 16 determines that the second device 3 complies with the ATA standard (step S53).

In step S54, the switching controller 16 issues an identify packet device command for the second device 3. The identify packet device command complies with the ATAPI standard. In step S55, the switching controller 16 reads the data of the status register in the second device 3 and checks an error bit of the read data. When the error bit is "1" (NO in step S55), this indicates that the second device 3 supports the identify packet device command (ATAPI standard). Thus, the switching controller 16 determines that the second device 3 supports the ATAPI standard (step S56).

If the error bit is "1" in step S55, the switching controller 16 proceeds to step S57 and determines that the second device 3 does not support the identify packet device command (ATAPI standard) and thus cannot be identified. Accordingly, the switching controller 16 disconnects the converters 21, 22, 24, 25, 27, and 28 from the first and second control circuits 11 and 12.

The operation of the first command converter 21 will now be discussed with reference to FIGS. 5 and 6.

Figure 5:
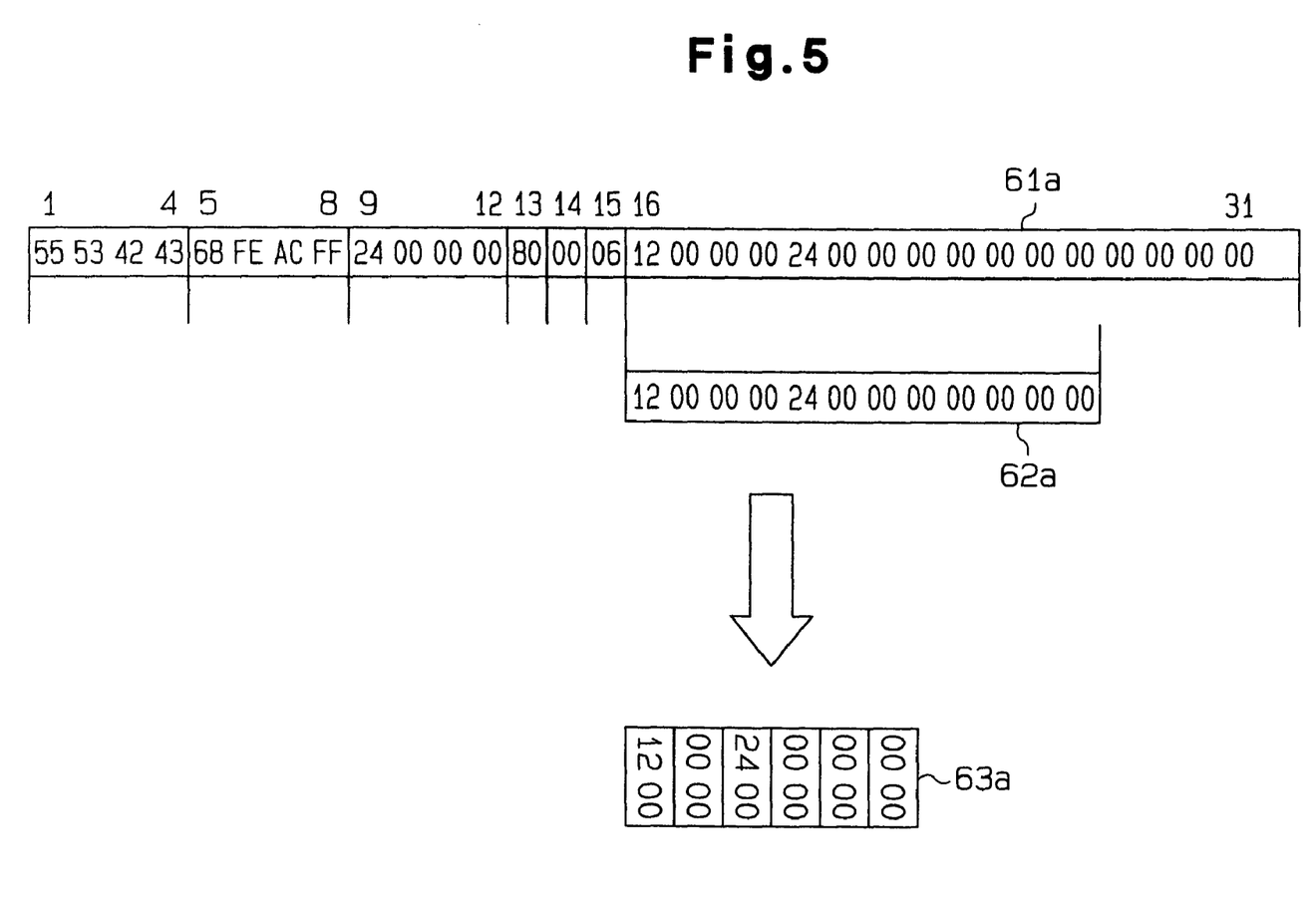
FIG. 5 is a diagram illustrating the operation of a first command converter.

Referring to FIG. 5, a command block 61a complying with the USB standard has thirty-one bytes of data.

The first command converter 21 refers to the first to fourth bytes of input data and the data size of the input data to determine whether the input data is a command complying with the USB standard. The fifth to eighth bytes of the data configure a tag code. The first command converter 21 stores the tag code in its memory and uses the tag code in a status response. The ninth to twelfth bytes of the data indicate the transfer data size and are referred to when transferring data. The thirteenth byte of the data is a data transfer flag. The fourteenth byte of the data indicates a logic device number of the first device 2. The fifteenth byte of the data indicates a valid byte number of the following command.

The first command converter 21 extracts the sixteenth byte to the twenty-seventh byte of the command block 61a and generates extracted data 62a, which complies with the ATAPI standard. The extracted data 62a is provided to the second device 3. The first command converter 21 ignores the effective data number in the fifteenth byte. This is because the ATAPI command provided from the second device 3 matches the valid data portion of the USB command block 61a.

The determination circuit 36 of the first command converter 21 determines whether the twelve bytes of the extracted data 62a is a command supported by the second device 3 (ATAPI). The sixteenth byte in the extracted data 62a is "12h" (h representing a hexadecimal, FIG. 5 shows only "12") and is a command supported by the ATAPI standard. Thus, the conversion circuit 37 of the first command converter 21 generates an ATAPI packet 63a from the extracted data 62a and outputs the ATAPI packet 63a.

Figure 6:
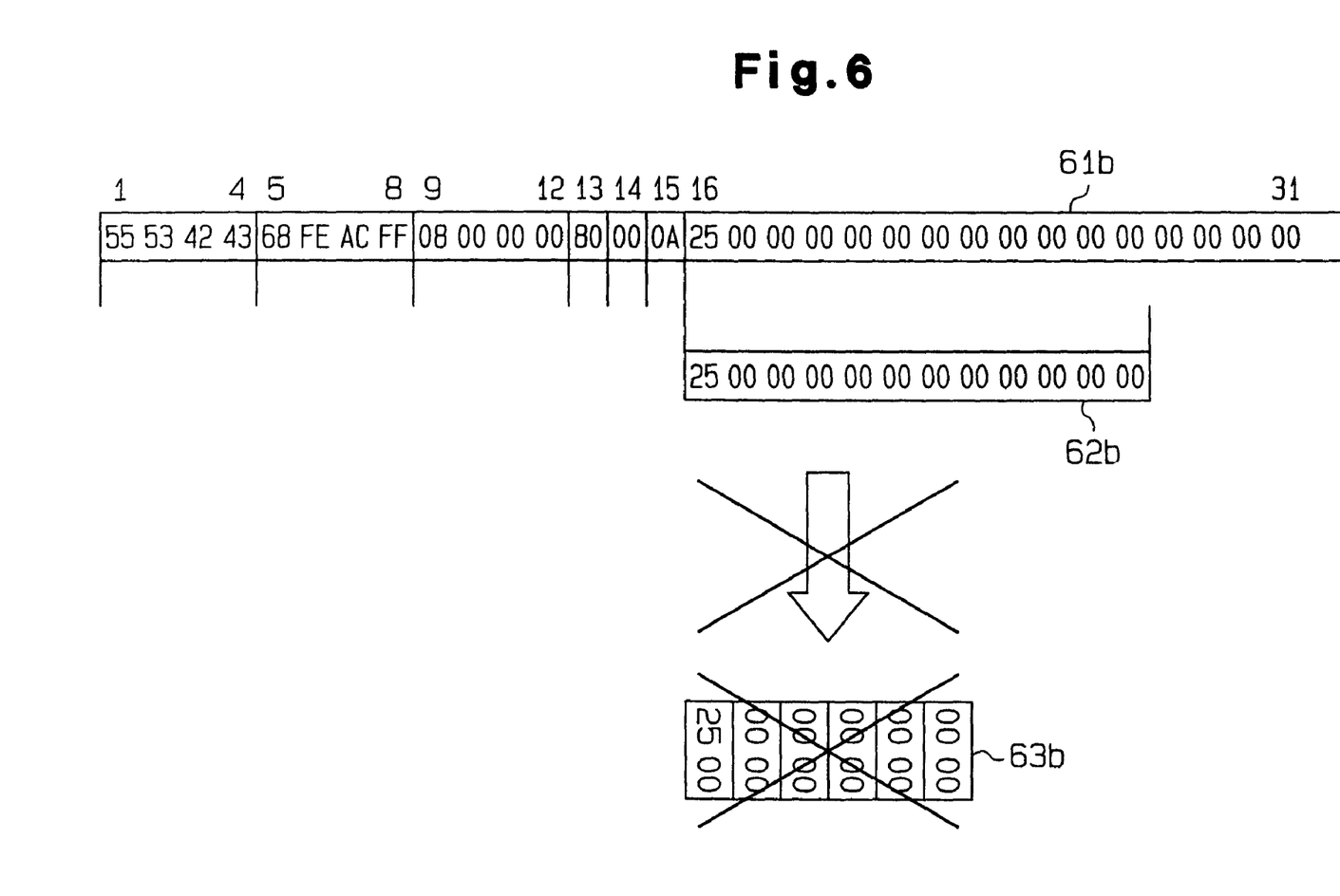
FIG. 6 is a diagram illustrating the operation of the first command converter.

FIG. 6 shows a command block 61b complying with the USB standard in which the sixteenth to twenty-seventh bytes are extracted to generate extracted data 62b. The head of the extracted data 62b is "25h" and is a command that is not supported by the ATAPI standard. Accordingly, the determination circuit (FIG. 2) of the first command converter 21 determines that the extracted data 62b is a command that does not have to be converted. In this case, the first command converter 21 does not generate an ATAPI packet 63b. Further, the determination circuit 36 outputs the error response output signal SER to notify the first device 2 of an error.

The operation of the second command converter 22 will now be discussed with reference to FIGS. 7 and 8.

In the same manner as the first command converter 21, the second command converter 22 extracts the sixteenth to twenty-seventh bytes of a command block 64a, which complies with the USB standard, to generate extracted data 65a. The second command converter 22 determines whether or not the convert the extracted data 65a based on the data of the sixteenth byte.

Figure 7:
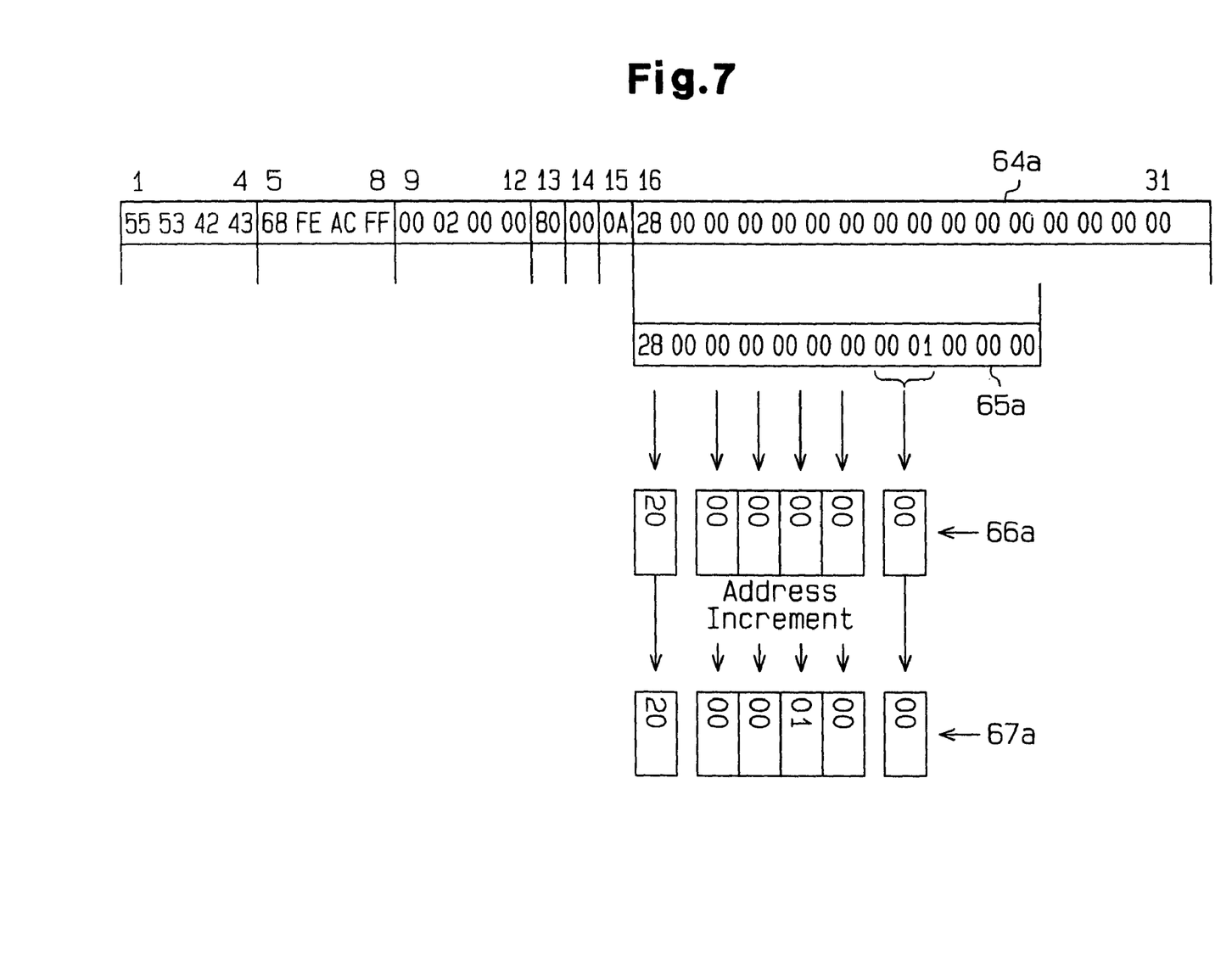
FIG. 7 is a diagram illustrating the operation of a second command converter.

FIG. 7 shows the command block 64a in which the data of the sixteenth byte is "28h" and is a command supported by the ATA standard. Accordingly, the second command converter 22 refers to the table 37a (FIG. 2) to generate a command 66a, which complies with the ATA standard, from extracted data 65a.

When the extracted data 65a is a command for performing data transfer, the second command converter 22 checks the quantity of the transferred data in the twenty-third and twenty-fourth bytes. When the quantity of the transfer data exceeds 256 sectors, the second command converter 22 divides the command 66a into a plurality of commands. In this state, the second command converter 22 generates a command 67a, the address of which is incremented. The command 67a complies with the ATA standard.

Figure 8:
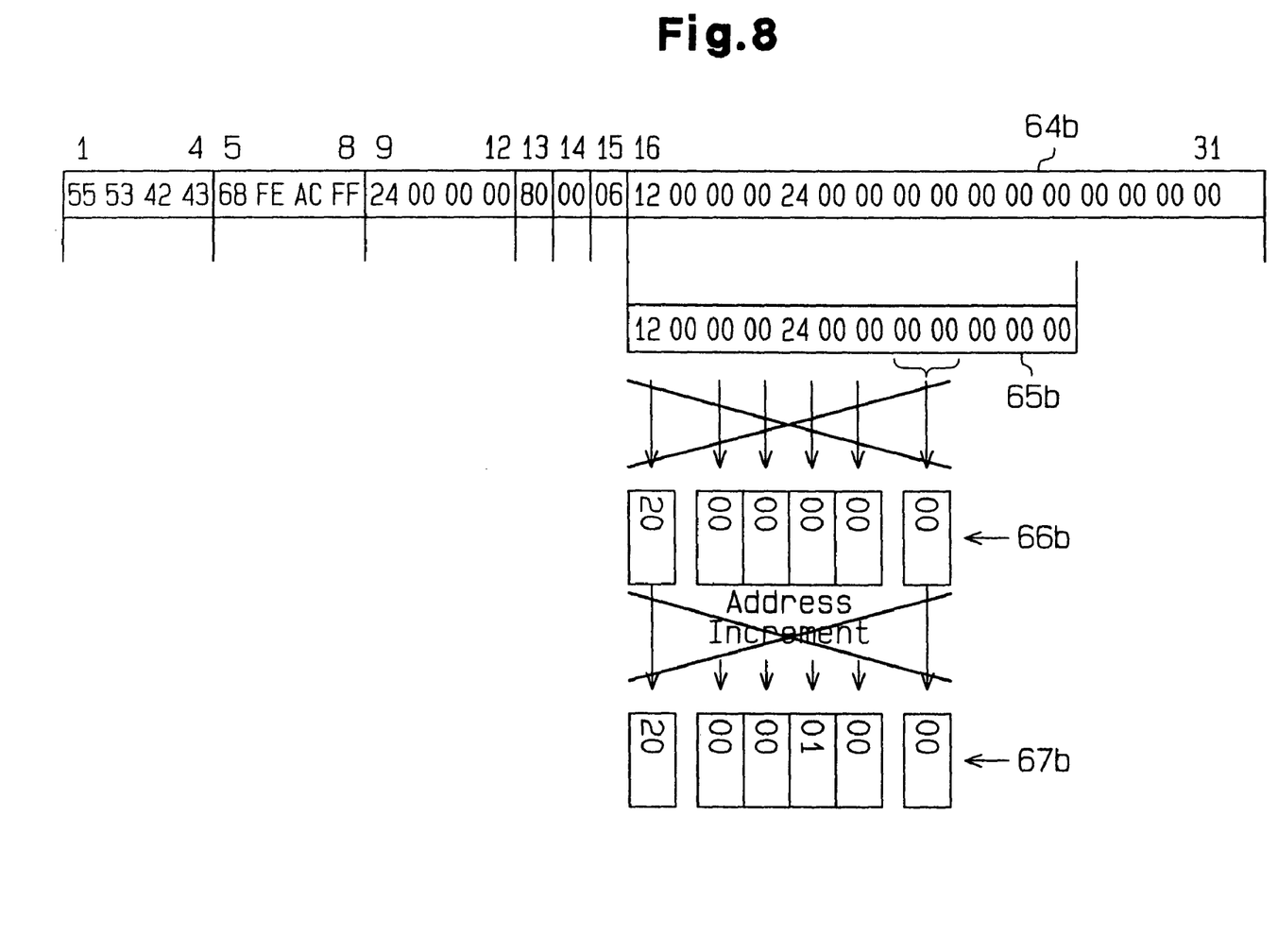
FIG. 8 is a diagram illustrating the operation of the second command converter.

Referring to FIG. 8, in a command block 64b complying with the USB standard, the data of the sixteenth byte is "12h", which is a command that is not supported by the ATA standard. Accordingly, the second command converter 22 does not provide the conversion circuit 37 with extracted data 65b. As a result, the second command converter 22 does not convert the extracted data 65b and does not generate commands 66b and 67b, which comply with the ATA standard. In the same manner as the determination circuit 36 of the first command converter 21, the determination circuit 36 of the second command converter 22 outputs the error response output signal SER to notify the first device 2 of an error.

Figure 9:
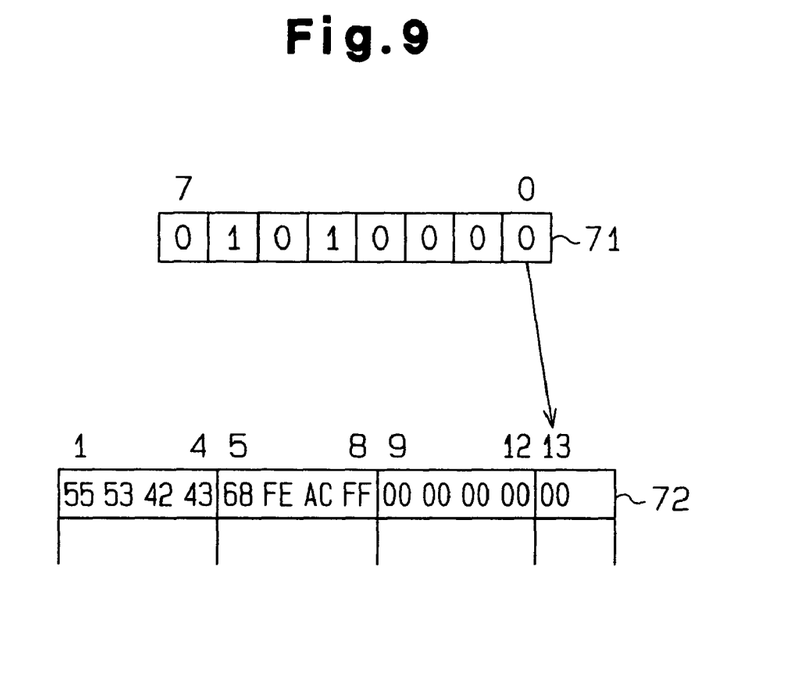
FIG. 9 is a diagram illustrating the operation of a first status converter.

The operation of the first status converter 24 will now be discussed with FIG. 9.

The ATAPI interface of the second device 3 is set to assert an interrupt request signal (INTRQ signal). When an error occurs or a command ends, the ATAPI interface asserts the INTRQ signal. Whenever INTRQ is asserted, the first status converter 24 reads the data of a status register 71 incorporated in the second device 3. The first status converter 24 generates a status block 72, which complies with the USB standard, based on the content of the status register 71.

When the seventh bit of the status register 71 is "0", the status register 71 is valid. In this case, the first status converter 24 determines whether or not there is an error based on the zero bit (error bit). There is no error when the zero bit is "0", and there is an error when the zero bit is "1". The first status converter 24 sets the thirteenth byte of the status block 72 in accordance with the zero bit. The "0" of the zero bit is converted to "00h" and the "1" of the zero bit is converted to "01h". Then the converted data is written to the thirteenth byte.

The first status converter 24 sets the remaining quantity of the data transferred by the USB interface in the ninth to twelfth bytes of the USB status block 72. The tag code (e.g., the fifth to eighth bytes of the USB command block 61a shown in FIG. 5) held by the first command converter 21 is stored in the fifth to eighth bytes. The first status converter 24 stores an identification code indicating the status of the USB interface in the first to fourth bytes of the status block 72 and transfers the first to fourth bytes to the first device 2 (USB host).

Figure 10:
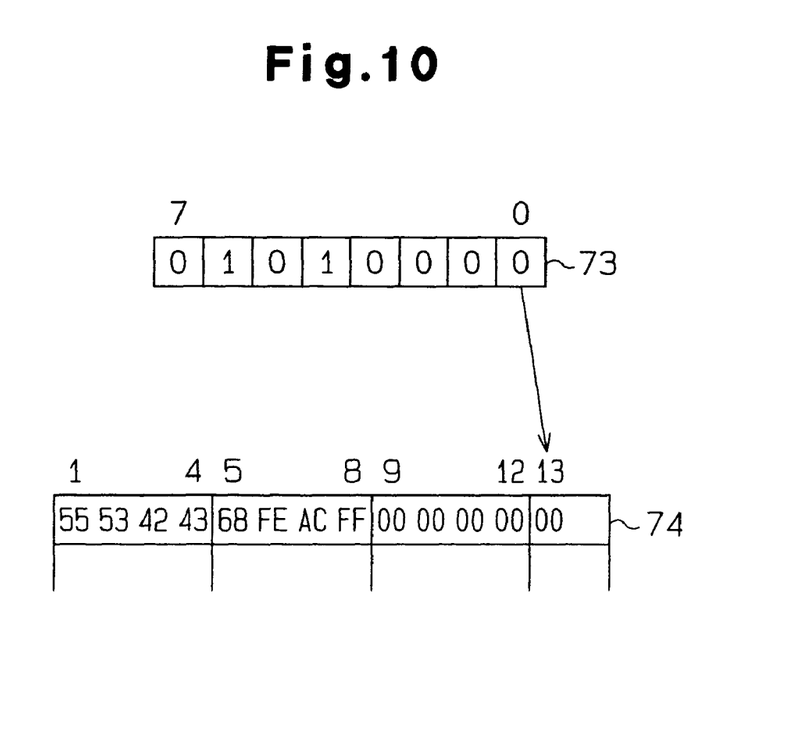
FIG. 10 is a diagram illustrating the operation of a second command converter.

The operation of the second status converter 25 will now be discussed with reference to FIG. 10.

Whenever a command issued by the second command converter 22 ends, the second status converter 25 reads the data of a status register 73 in the second device 3. In this state, the second status converter 25 stores the quantity of the remaining sectors in the ninth to twelfth bytes of a status block 74 when an error occurs based on the content of zero bit of the status register 73. The second status converter 25 stores "01h" in the thirteenth byte of the status block 74. Further, the second status converter 25 stores the tag code held by the second command converter 22 in the fifth to eighth bytes of the status block 74. The second status converter 25 stores an identification code (signature) indicating the status of the USB interface in the first to fourth bytes of the status block 74 and transfers the status block 74 as an error response to the first device 2 (USB host).

When all of the commands in a USB command end normally, the second status converter 25 stores "00h" in the ninth to thirteenth bytes of the USB status block 74. The second status converter 25 stores the tag code held by the second command converter 22 in the fifth to eighth bytes, stores an identification code indicating a USB status in the first to fourth bytes, and performs a status response.

The preferred embodiment has the advantages described below.

(1) The interface converter 1 includes the first command converter, which complies with the USB and ATAPI standards, and a second command converter 22, which complies with the USB and ATA standards. The switching controller 16 checks the interface type of the second device 3 and connects the first command converter 21 or the second command converter 22 to the second device 3 via the control circuit 12 in accordance with the interface type. In accordance with the interface type of the second device 3, the interface converter 1 selects the first command converter 21 or the second command converter 22. This ensures the connection of the second device 3 and the first device 2.

(2) The determination circuit 36, which is provided in each of the first and second command converters 21 and 22, determines whether or not to convert a command from the USB interface to an ATAPI or ATA command and generates the error response output signal SER when determining not to convert the USB command. The first status converter 24 or the second status converter 25 provides the first device 2 with the error status signal in response to the error response output signal SER. As a result, the interface converter 1 responds to commands that are not supported by the ATAPI or ATA standard. This improves response.

(3) The data checker 41, which is provided in each of the first and second data converters 27 and 28, checks whether or not the input data has a portion that matches a predetermined data pattern and does not output the data when there is a matching portion. As a result, illicit data, such as a computer virus, is prevented from being transferred to the first and second devices 2 and 3. This improves data security.

(4) The error correction code processor 42, which is provided in each of the first and second data converters 27 and 28 adds error correction and error detection codes to data and outputs the processed data. This prevents erroneous data from being transferred to the first and second devices 2 and 3.

(5) The encoder 43 and the decoder 44, which are provided in each of the first and second data converters 27 and 28, respectively encodes and decodes data. The second device 3, such as a HDD, records encoded data. Thus, a third person cannot correctly read the data recorded to the second device. This prevents data leakage.

It should be apparent to those skilled in the art that the present invention may be embodied in many other specific forms without departing from the spirit or scope of the invention. Particularly, it should be understood that the present invention may be embodied in the following forms.

Figure 11:
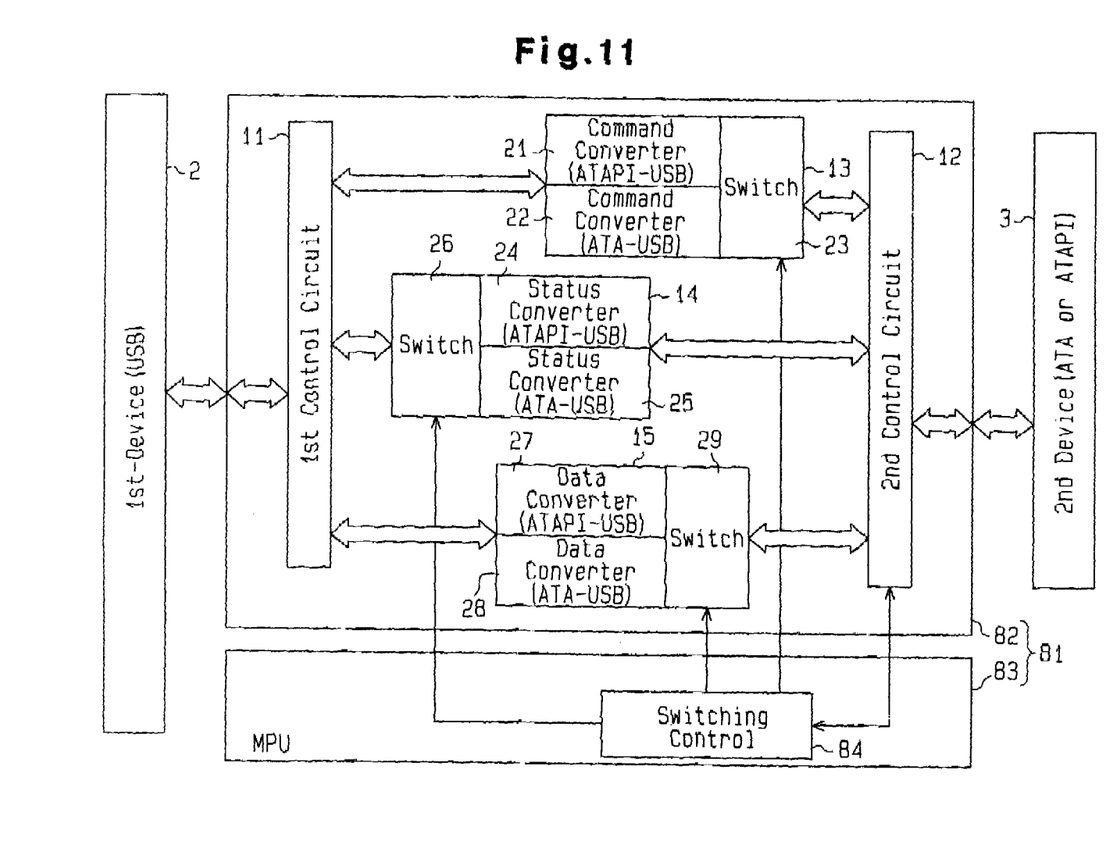
FIG. 11 is a block diagram of an interface converter according to a further embodiment of the present invention.

Some of the functions of the interface converter 1, or the various interface converting processes performed with hardware, may be performed with software. For example, the interface converter 81 of FIG. 11 includes a converting section 82 and an MPU 83. The converting section 82 includes first and second control circuits 11 and 12, a command converting section 13, a status converting section 14, and a data converting section 15. The MPU 83 executes a program 84, which functions as a switching control means. The program 84 is stored in a memory of the MPU 83 and in memories accessed by the MPU 83. Since the switching control means is the program 84, checking sequences and issued commands may easily be changed. The program 84 is required to be executed only when the second device 3 is connected or when the interface converter 81 is activated. Thus, the program does not have to be executed constantly. This reduces the power consumption of the interface converter 81 (converting section 82).

Commands, status, and data are converted between the USB interface and the ATA or ATAPI interfaces. However, communication between the USB interface and the ATA or ATAPI interface is enabled as long as at least the command is converted. Accordingly, at least one of the status converting section 14 and the data converting section 15 may be eliminated from the interface converter 1 of FIG. 1.

Figure 12:
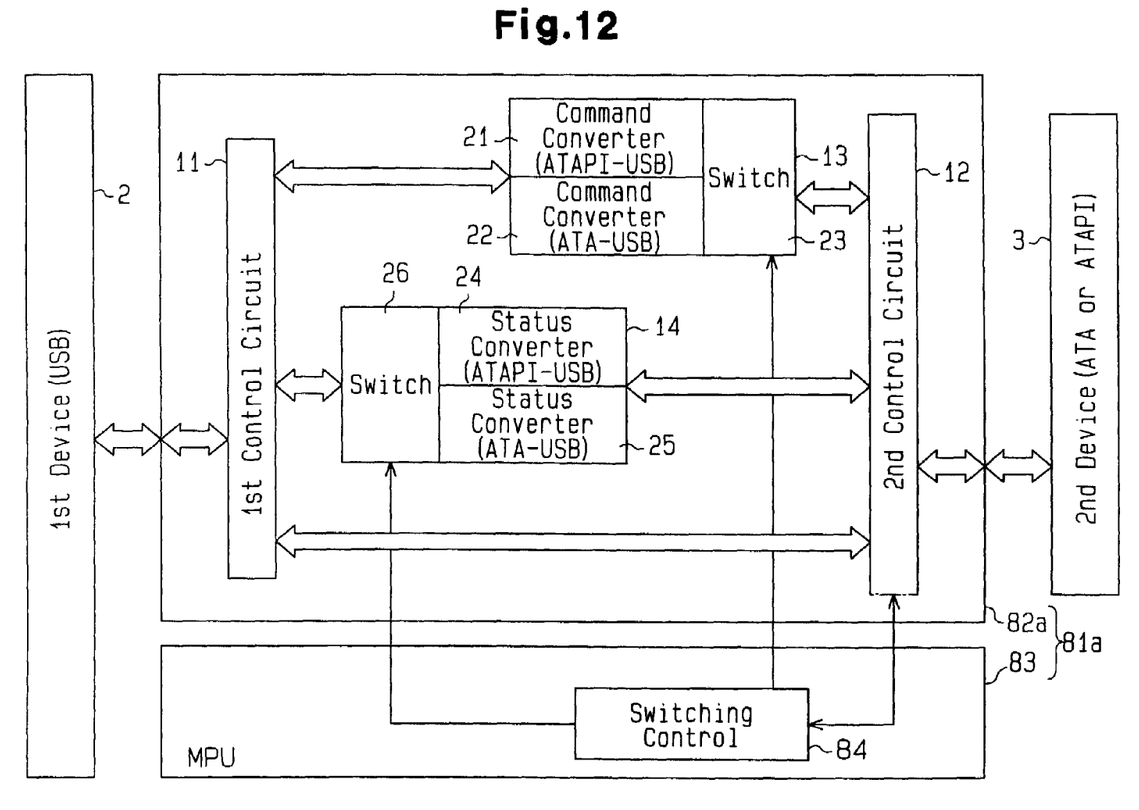
FIG. 12 is a block diagram of an interface converter according to a further embodiment of the present invention.

As shown in FIG. 12, an interface converter 81a may be configured by first and second control circuits 11 and 12 and a converting section 82a, which includes a command converting section 13 and a status converting section 14.

The converting function and the checking function of the interface converter 1 may be performed with software. For example, referring to FIG. 13, an interface converter 81b includes a converting section 82a and an MPU 83a, which are configured on a single chip. The converting section 82b includes first and second control circuits 11 and 12. The MPU 83a executes a checking program 84, which functions as a switching control means, a command conversion program 85, which functions as a command converting means, and a status conversion program 86, which functions as a status converting means. The MPU 83 may also be configured to execute a data conversion program, which functions as a data converting means. The programs 84, 85, and 86 are stored in a memory of the MPU 83a or in a memory accessed by the MPU 83a.

Figure 13:
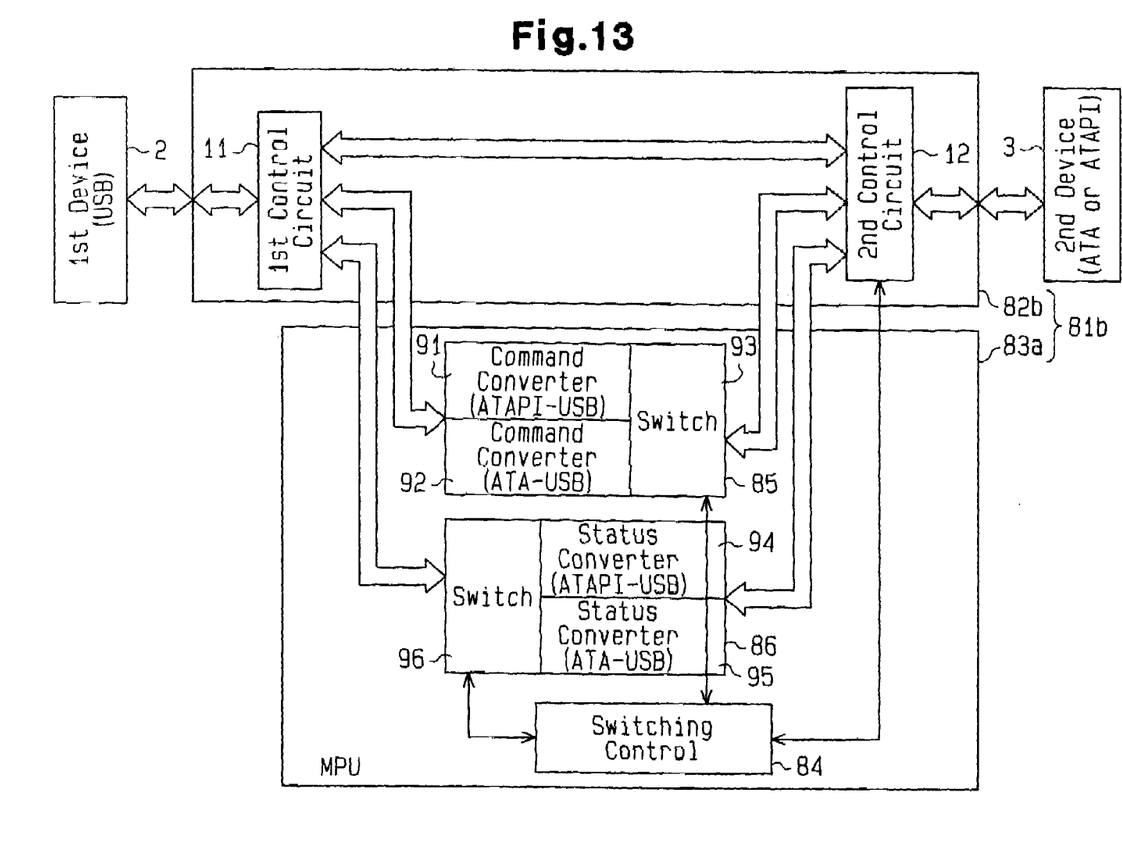
FIG. 13 is a block diagram of an interface converter according to a further embodiment of the present invention.

The command conversion program 85 includes a program functioning as a first command converter, a program 92 functioning as a second command converter, and a program 93 functioning as a switching circuit. The MPU 83a executes the program to convert a command between a first interface and a second interface and executes the program 92 to execute a command between the first interface and a third interface. Based on a command generated from the checking program 84, the program 93 switches the execution of the program 91 and the program 92 (for example, switches a pointer indicating the command executed by the MPU 83a).

The status conversion program 86 includes a program 94 functioning as a first status converter, a program 95 functioning as a second status converter, and a program 96 functioning as a switching circuit. The MPU 83a executes the program 94 to convert a status between the first interface and the second interface and executes the program 95 to convert a status between the first interface and the third interface. Based on a command generated from the checking program 84, the program 96 switches the execution of the program 94 and the program 95 (for example, switches a pointer indicating the command executed by the MPU 83*a*).

In such a configuration, even if the interfaces of the first device 2 or the second device 3 are changed, programs may be switched to perform conversions accordingly. This facilitates adaptation to a new interface within a short period of time.

In each of the above embodiments, the conversion process for adapting to an ATA interface and the conversion process for adapting to an ATAPI interface are both performed with hardware or software. However, one of the conversion processes may be performed with hardware and the other one of the conversion processes may be performed with software.

The present examples and embodiments are to be considered as illustrative and not restrictive, and the invention is not to be limited to the details given herein, but may be modified within the scope and equivalence of the appended claims.

What is claimed is:

1. An interface converter connected to a device having an interface, the interface converter comprising:
   a first command converter for converting a command between one complying with a first interface standard and one complying with a second interface standard;
   a second command converter for converting a command between one complying with the first interface standard and one complying with a third interface standard; and
   a switching controller for checking whether the interface of the device complies with the second interface or the third interface and selects the first command converter or the second command converter in accordance with the checking result.

2. The interface converter according to claim 1, wherein the switching controller issues a command to the device and checks whether the interface of the device complies with the second interface or the third interface based on status information generated by the device in response to the command.

3. The interface converter according to claim 1, wherein the interface converter is connectable to another device having an interface complying with the first interface standard, at least one of the first and second command converters includes a determination circuit for determining whether to convert a command complying with the first interface standard to a command complying with the second interface standard or the third interface standard, the at least one of the first and second command converters generating an error status signal when not converting the command, and the interface converter providing the error status signal to said another device.

4. The interface converter according to claim 1, wherein at least one of the first and second command converters uses a table storing commands associated with the first, second, and third interface standards to convert a command.

5. The interface converter according to claim 1, further comprising:
   a first status converter for converting a status between one complying with the first interface standard and one complying with the second interface; and
   a second status converter for converting a status between one complying with the first interface standard and one complying with the third interface standard, and
   wherein the switching controller selects the first status converter or the second status converter in accordance with the checking result.

6. The interface converter according to claim 1, further comprising;
   a first data converter for converting a datum between one complying with the first interface standard and one complying with the second interface standard; and
   a second data converter for converting a datum between one complying with the first interface standard and one complying with the third interface standard, and
   wherein the switching controller selects the first data converter or the second data converter in accordance with the checking result.

7. The interface converter according to claim 6, wherein at least one of the first and second data converters encodes or decodes input data to convert data.

8. The interface converter according to claim 6, wherein at least one of the first and second data converters generates converted data to which an error correction code is added.

9. The interface converter according to claim 6, wherein at least one of the first and second data converters determines whether input data includes a predetermined data pattern and stops outputting the input data when the predetermined data pattern is included.

10. A method for converting a command between one complying with a first interface standard and one complying with a second or third interface standard for communication with a device through an interface thereof, the method comprising:
    connecting the interface of the device to an interface converter having first and second command converters, which convert commands from compliance with the first interface standard to compliance with the second or third interface standard, respectively;
    checking whether the interface of the device connected to the interface converter complies with the second interface standard or the third interface standard; and
    selecting the first command converter or the second command converter in accordance with the result of said checking.

11. The method according to claim 10, wherein said checking includes:
    sequentially issuing to the device a first command complying with the second interface standard and a second command complying with the third interface standard;
    referring to status information of the device for at least one of the first and second commands; and
    checking the type of the interface of the device in accordance with the result of said referring.

12. The method according to claim 10, further comprising:
    determining whether to convert a command complying with the first interface standard to a command complying with the second or third interface standard; and
    generating an error status signal when the command is not converted.

13. An interface converter for functionally connecting a first device having an interface complying with a first interface standard and a second device having an interface complying with a second interface standard or a third interface standard, the interface converter comprising:
    a first command converter for converting a command between one complying with the first interface standard and one complying with the second interface standard;

a second command converter for converting a command between one complying with the first interface standard and one complying with the third interface standard; and a switching controller for checking whether the interface of the second device complies with the second interface or the third interface and activating the first command converter or the second command converter in accordance with the checking result.

14. The interface converter according to claim 13, further comprising:

a first data converter for converting a datum between one complying with the first interface standard and one complying with the second interface standard; and a second data converter for converting a datum between one complying with the first interface standard and one complying with the third interface standard, and wherein the switching controller activates the first data converter or the second data converter in accordance with the checking result.

15. The interface converter according to claim 14, wherein the first and second data converters each include an encoder for encoding converted data and a decoder for decoding converted data.

16. A method for functionally connecting a first device having an interface complying with a first interface standard and a second device having an interface complying with a second interface standard or a third interface standard, the method comprising:

providing first and second command converters, which convert a command between one complying with the first interface standard and one complying with the second or third interface standard, respectively;

checking whether the interface of the second device complies with the second interface standard or the third interface standard; and activating the first command converter or the second command converter in accordance with the result of said checking.

17. The method according to claim 16, wherein said checking includes:

sequentially issuing to the second device a first identify device command complying with the second interface standard and a second identify device command complying with the third interface standard;

referring to status information of the second device for at least one of the first and second identify device commands; and checking the type of the interface of the second device in accordance with the result of said referring.

* * * * *